US007253800B2

(12) United States Patent
Goldberg et al.

(10) Patent No.: US 7,253,800 B2
(45) Date of Patent: Aug. 7, 2007

(54) MANIPULATIVE USER INTERFACE SYSTEMS AND METHODS

(75) Inventors: David Goldberg, Palo Alto, CA (US); Kenneth P. Fishkin, Redwood City, CA (US); Anuj Uday Gujar, Mountain View, CA (US); Elizabeth D. Mynatt, Atlanta, GA (US); Roy Want, Los Altos, CA (US)

(73) Assignee: Xerox Corporation, Stamford, CT (US)

(*) Notice: Subject to any disclaimer, the term of this patent is extended or adjusted under 35 U.S.C. 154(b) by 767 days.

(21) Appl. No.: 09/682,333

(22) Filed: Aug. 21, 2001

(65) Prior Publication Data

US 2003/0038773 A1   Feb. 27, 2003

(51) Int. Cl.
*G09G 5/00* (2006.01)

(52) U.S. Cl. .................. 345/156; 345/184; 434/155; 434/393; 463/37

(58) Field of Classification Search ........ 345/156–169, 345/7–9; 273/148 R, 148 B; 434/169, 307 R, 434/308, 365, 393, 155; 463/37–38; 705/42–45; 341/21–22; 348/734; 314/21–22
See application file for complete search history.

(56) References Cited

U.S. PATENT DOCUMENTS

| | | | | | |
|---|---|---|---|---|---|
| 5,402,492 | A | * | 3/1995 | Goodman et al. | 380/25 |
| 5,444,499 | A | * | 8/1995 | Saitoh | 348/734 |
| 5,452,479 | A | * | 9/1995 | Mostert | 2/195.1 |
| D370,219 | S | * | 5/1996 | Blumer et al. | D14/403 |
| D386,160 | S | * | 11/1997 | Young | D14/403 |
| 5,746,602 | A | * | 5/1998 | Kikinis | 534/169 |
| 5,766,077 | A | * | 6/1998 | Hongo | 273/148 B |
| 5,841,868 | A | * | 11/1998 | Helbig, Sr. | 235/380 |
| 5,845,265 | A | * | 12/1998 | Woolston | 705/37 |
| 5,855,483 | A | * | 1/1999 | Collins et al. | 434/322 |
| 5,912,454 | A | * | 6/1999 | Castillo et al. | 273/374 |
| 5,983,273 | A | * | 11/1999 | White et al. | 709/229 |
| 6,052,116 | A | * | 4/2000 | Takagi | 345/169 |
| 6,137,480 | A | * | 10/2000 | Shintani | 345/169 |
| 6,160,540 | A | * | 12/2000 | Fishkin et al. | 345/156 |
| 6,243,074 | B1 | | 6/2001 | Fishkin et al. | 345/156 |
| 6,243,075 | B1 | | 6/2001 | Fishkin et al. | 345/156 |
| 6,257,984 | B1 | * | 7/2001 | Gershon | 463/48 |
| 6,268,857 | B1 | | 7/2001 | Fishkin et al. | 345/358 |
| 6,290,565 | B1 | * | 9/2001 | Galyean III et al. | 273/148 B |
| 6,297,805 | B1 | | 10/2001 | Adler et al. | 345/158 |
| 6,297,838 | B1 | | 10/2001 | Chang et al. | 345/158 |

(Continued)

FOREIGN PATENT DOCUMENTS

EP       0929027     *  7/1999

OTHER PUBLICATIONS

U.S. Appl. No. 08/921,414, filed Aug. 29, 1997.

*Primary Examiner*—Lun-Yi Lao
(74) *Attorney, Agent, or Firm*—Oliff & Berridge, PLC

(57) ABSTRACT

Two previously virtual concepts, such as, for example, the concept of "me" and the concept of "my data" are reified into physical objects which can be physically manipulated and interact with legacy technologies such as, for example, desktop or portable computers. In one exemplary embodiment, a portable computing device in the form of an animal, such as, for example, a bear, with a manipulatable user interface, is used to log onto and off of various computers.

19 Claims, 1 Drawing Sheet

U.S. PATENT DOCUMENTS

| | | | |
|---|---|---|---|
| 6,340,957 B1 | 1/2002 | Adler et al. | 340/903 |
| 6,366,149 B1* | 4/2002 | Lee et al. | 327/276 |
| 6,380,924 B1* | 4/2002 | Yee et al. | 345/156 |
| 6,438,752 B1* | 8/2002 | McClard | 725/46 |
| 6,567,793 B1* | 5/2003 | Hicks et al. | 705/51 |
| 6,807,291 B1* | 10/2004 | Tumey et al. | 382/124 |
| 6,868,170 B1* | 3/2005 | Fuku et al. | 382/124 |

* cited by examiner

MANIPULATIVE USER INTERFACE SYSTEMS AND METHODS

BACKGROUND OF THE INVENTION

1. Field of Invention

This invention relates to reification of virtual concepts into physical devices having manipulative user interfaces.

2. Description of Related Art

This invention is related to co-pending application, Ser. Nos. 08/921,274, now U.S. Patent No. 6,243,075; Ser. No. 08/920,443, now U.S. Patent No. 6,268,857; Ser. No. 08/921,414, now abandoned; Ser. No. 08/920,378, now U.S. Pat. No. 6,243,074; Ser. No. 08/920,363, now U.S. Pat. No. 6,297,838; Ser. No. 08/920,981, now U.S. Pat. No. 6,297,805; and Ser. No. 08/921,390, now U.S. Pat. No. 6,340,957, each incorporated herein by reference in its entirety. These applications disclose manipulatable computer user interfaces (MIUI).

A wide variety of smart cards exist which can interact with computers and computer systems, including networked computer systems. These smart cards are usually inserted into a computer and provide electronic signals representative of predetermined information, such as personal characteristics of an individual, financial information about an individual, security clearance of an individual, etc.

Typically, smart cards have a definite size and shape. The computer device with which they are designed to work has a receptacle for accepting the smart card to permit transfer of information between the smart card and the computer. Smart cards are not physically manipulated, i.e., they retain their unique physical shape and orientation while they interact with a computer device. Smart cards are also designed to fit into a specific receptacle, and the information they convey to the computer or receive from the computer does not change depending on where they are located with respect to the computer with which they are designed to interact.

SUMMARY OF THE INVENTION

In various exemplary embodiments, the systems and methods according to the invention takes two previously virtual concepts, the concept of "a user" and the concept of "the user's data" and treats these virtual concepts as physical objects. This invention reifies these two virtual concepts as physical objects which can contain state, such as, for example, status information about "the user", and which can be physically manipulated. In various exemplary embodiments, the systems and methods according to this invention focus on the interaction between such physically reified data about me, such as, for example, status information about "the user" to legacy technologies such as, for example, desktop or portable computers.

In various exemplary embodiments, the systems and methods of this invention allow an individual user (i.e. "the user") to control a process in one physical device, such as, for example, a computer, by physically manipulating one or more other physical devices, such as, for example, a representation or reification, of that "user".

In various exemplary embodiments, the systems and methods of this invention also allow an individual user (i.e. "the user") to control one or more processes or functions in one or more first physical devices, such as, for example, one or more computers, by changing the location or placement of one or more second "reified" physical devices relative to the first physical device, such as, for example, the placement of a second physical device on the computer case.

The manipulative user interface (MUI) according to this invention includes at least two devices, in which adjust device uses a manipulative user interface to control its interaction with another device when the first is brought next to, or taken away from, the other device, which may or may not itself have a manipulative user interface.

Manipulative user interface devices are disclosed in the incorporated patent applications outlined above.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the accompanying drawings, wherein.

DETAILED DESCRIPTION OF PREFERRED EMBODIMENTS

In a first exemplary embodiment, a portable computing device or reified device is used to control the log-on/log-off process with respect to various desktop or laptop computers. When the reified device is placed on or near the desktop computer, if necessary, and appropriately manipulated, the reified device logs the user or owner of the reified device, i.e. the person who is reified by the reified device, onto the computer. When the reified device is removed, and, if necessary, appropriately manipulated, the user is logged off.

Physical attributes, such as for example, size, shape, color, and/or weight or the like, of the reified device may vary considerably. If, for example, the reified device is relatively large, it will probably be kept in a limited area, such as, for example, an office, so that physically manipulating the reified device and/or manipulating physical characteristics of the reified device is a part of the security systems of a second device, such as, for example, a computer. If the reified device is small enough to be put in a pocket, for example, it could be carried more like a key or smart card. The reified device could be designed to be worn, such as, for example, on a wrist or a necklace.

Figure 1:
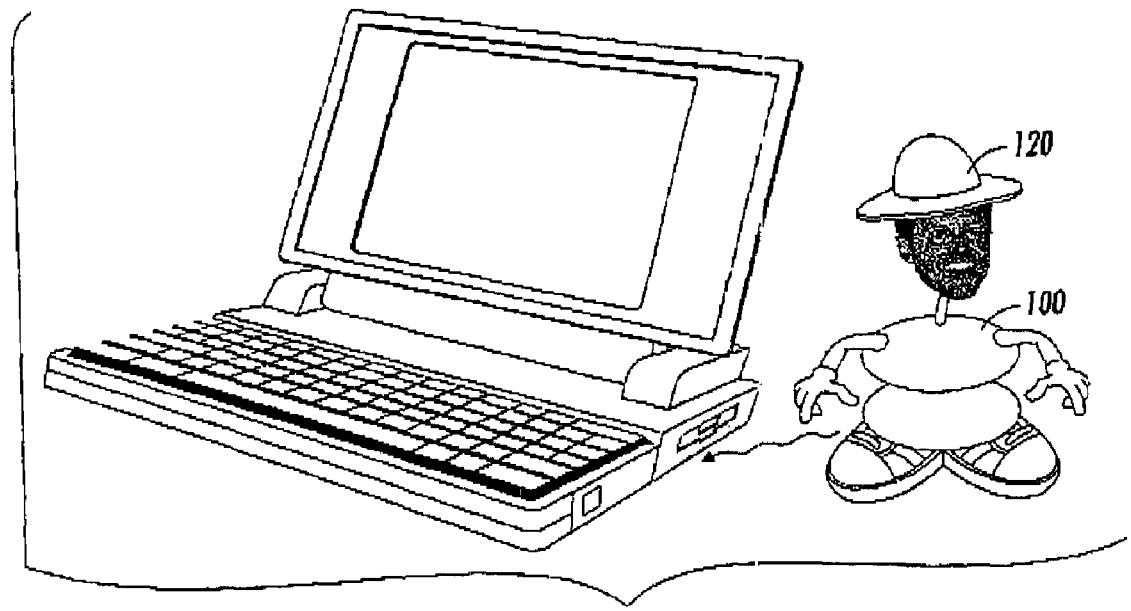
FIG. 1 shows a first exemplary embodiment of a reified device in the form of a bear located relative to a desktop computer.

FIG. 1 shows one exemplary embodiment of the reified device and a computer as a responsive device, that is, a device that in some way responds to manipulations of the reified device. In this exemplary embodiment, the reified device, which reifies state data of the user or owner, is a statue of a bear 100. The statue of the bear 100 may have some or all of the physical characteristics of a real bear. It may have the waist-up attributes, alone, for example, or all of the physical attributes, from head to toe, for example. The physically manipulations of the reified device, e.g., statue of the bear, may include numerous different manipulations such as, for example, wiggling the bear's ears, pushing the bear's nose, stretching a leg or arm of the statue of the bear 100, pivoting a hand, arm or toe of the statue of the bear 100.

This may also include placing an object relative to the statue of the bear 100. In this care, that object can represent a function to be performed on the computer i.e., the responsive object, or a relationship of the owner of the reified object wishes to have with the computer. In one exemplary embodiment, this representative object is, for example, a hat 120. The hat 120 indicates the relationship, such as, for example, the level of authority of the reified individual wishes to have at this moment or has been granted by access to the reified object, such as, for example, the statue of the bear 100. In one exemplary embodiment, the hat 120 may represent the relationship "system administrator." Thus, when a user places a hat on, or otherwise manipulates the, statue of the bear 100 when it is wearing the hat 120, to log onto the computer, the computer recognizes that user as being a system administrator for this session.

Moreover, because a bear is not a rational animal, whereas the user is, the reified device may be in the form of a rational animal such as, for example, a statue of a, human. Thus, is another exemplary embodiment of the invention a plurality of different user reified devices can be used to reify a plurality of different users. A user reified device may also be in any other form, such as, for example, a form which may denote or connote a personal or other characteristic or aspect, such as, for example, an asset, a credit card number, or the like, of the user.

In various exemplary embodiments of the systems and methods of this invention, the reified device is physically manipulable. Physical manipulations of the reified device can be used to control various aspects of, for example, the process of logging onto and off of a computer, such as, for example, a desktop or laptop or hand held or wrist worn computer. For example, when the user wishes to log on to a computer, the user or owner often needs to provide a password. The password could be contained within the reified device 100, as the password typically might be in a smart card. However, this lends the reified device 100 (and the smart card) vulnerable to theft. A security feature of the reified device, which is not found in smart cards, is the fact that the reified device is designed and constructed to be physically manipulated. The password can, for example, be implemented and/or controlled by a particular sequence of physical manipulations. If the reified device 100 is stolen, unless the thief knows what physical manipulations need to be made to the reified device 100, and the sequence of operation of the manipulations, the reified device 100 will not log the thief in as the user. For example, it may be that the user has to squeeze the reified device 100 in a particular place or in a sequence of particular places, for particular time durations, before the reified device 100 will provide the password needed to log the user onto, or log the user off of,the computer.

After the user has logged onto a computer, the reified device 100 may be placed in specific locations relative to a computer interface with which the reified device is able to communicate to indicate which programs are to be started, which functions of computer control are to be accessed, or which computer hardware or software is to be accessed, operated and/or disabled, etc. Physical manipulations of the reified device can indicate these selections or the order in which certain computer hardware or software is accessed, disabled or monitored, and can change values of various computer parameters. For example, by placing the reified device on different parts of the desktop surface, the user can indicate which places within the virtual world of the desktop are to be visited or opened.

In various exemplary embodiments, when the user wishes to log on to the computer, various levels of security/permission parameters can be requested, such as, for example, user vs. group-owner vs. super-user vs. administrator, etc. based on the particular physical manipulations of the reified device made by the user. In various exemplary embodiments, physical manipulation of the reified device can indicate one or more value of this parameter. For example, by placing different physical items, such as, for example, a "hat", on the reified device, different log-on states can be signaled. The user corresponding to a particular reified device 100 associates the system administrator "hat" with that reified device 100 and uses that reified device to log on. For example, a "hat" indicating the user has system administrator authority can be attached to, or otherwise associated with, the reified device. This tells the log-on system to log that user on as a system administrator, i.e., the user is telling the log-on system, "I'm wearing my administrator's hat."

In various exemplary embodiments, when the user wishes to log on to a computer, various levels of connectivity to networks can be requested, for example, to log the user on the computer locally only, to log the user onto a local network or, to log the user onto to the web, etc., based on the particular physical manipulation of the reified device made by the user. Physical manipulations of the reified device 100 can indicate one or more values of this parameter.

Because the exact protocol by which a user logs on to a computer can, and often does, vary with the type of computer, the reified device 100 can log the user onto the user's personal computer at work, the user's personal computer at home, the user's laptop computer, and/or the user's work station. Different manipulations of the reified device 100 may allow the user or owner of the reified device to effectuate such details, freeing the user or owner to only have to remember the physical manipulations rather than a complicated series of keyboard commands.

Various exemplary embodiments according to the invention concern physical reification of some portion of state data and physical manipulation of this physical reification to control operations on such data in conjunction with some second device.

In general, the number of non-reified ("standard") devices can vary. For example, different functions can be assigned to different reified devices 100. Also, one or more reified devices 100 can interact with one or more various base devices. For example, a reified device 100 could log a user or owner onto various personal computers or one or more workstations.

The data, such as, for example, state data, contained within the reified device can vary, and can be static or dynamic. One particularly powerful set of data is data that represents the user or owner to a computer, such as, for example, a user or owner ID, a password, etc. However, this is by no means the only such useful set of data. In one exemplary embodiment, for example, the reified device could contain data that the user wishes to back up onto the computer base device 200.

Figure 2:
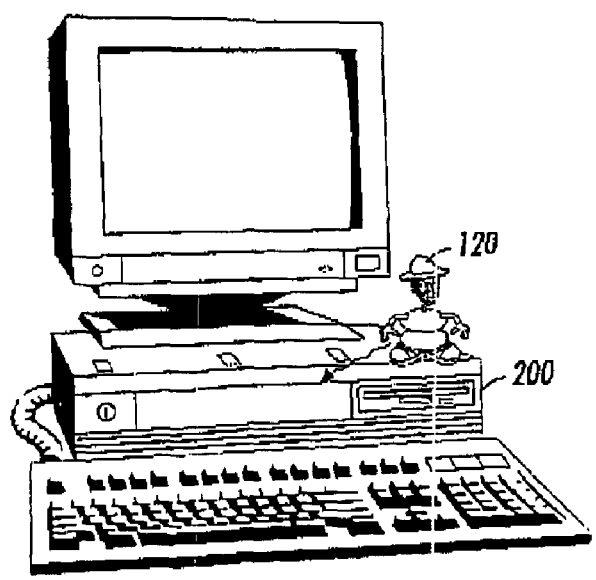
FIG. 2 shows a second exemplary embodiment of a reified device in the form of a bear with a hat located relative to a desktop computer.

FIG. 2 shows an exemplary embodiment of the invention in which the position of the reified device 100 relative to the computer device 200 controls the interface between the reified device and the computer device 200. The reified device 100 is placed on a corner of a desktop computer device 200. When the user places the reified device in an appropriate position on or near the base device 200, the base device 200 backs up data from the base device 200 to the reified device 100. In another exemplary embodiment, the user may return the reified device 100 to the computer base device 200, and manipulate the reified device 100 in a particular way, such as, for example, push a button on the reified device 100 to restore the backed up data from the reified device 100 to the base device 200. In another exemplary embodiment, the reified device 100 is used to record and play back macros. For example, the user may place the reified device 100 on the computer device 200 in a particular location, and then manipulates the reified device 100 to record the user's or owner's data, e.g., a macro, until the user or owner performs a second manipulation of the reified device. The user or owner may perform a third manipulation of the reified device 100 to signal the computer device 200 to play back the recorded macro.

While data may be stored within the reified device 100, the data need not be actually stored in the reified device 100. The data could be stored on a network, with the reified device 100 containing a key to the stored data.

In general, any arbitrary operation can be performed when the reified device 100 is physically manipulated or placed on or near the computer base device 200.

In implementing various exemplary embodiments of this invention, two areas of functionality should be implemented, including, detecting the physical manipulations or physical placement of the reified device, and performing operations between the reified device 100 and computer base device 200. In particular, the incorporated manipulative user interface patent applications, describe how physical manipulations on a reified device can be detected.

Performing operations between a reified device 100 and a base device 200 often uses communication hardware, and often needs a protocol for communicating information via the communication hardware.

The communication hardware can vary depending on whether the user wants the reified device 100 to (a) fit into a special receptacle on the base device 200, (b) work when in contact with but not penetrating the base device 200, or (c) function when in proximity to the base device 200. In the first case, any standard "docking" configuration, such as a docking station, or a parallel or serial port can be employed. In the second case, magnetically activated contact switches can be employed. In the third case, where proximate communication between the reified device 100 and the base device 200 or between two reified devices 100 is desirable, a plurality of techniques can be used, including wireless technologies, such as radio, infrared, and/or ultrasonic. One example of a product that support radio frequency communication is the TXM-418-F transmitter and SILRX-418-A receiver from Radio-Tech Ltd. These devices are small, have low power consumption and have a range that can be adjusted from 1-100 meters. Serial RS232-style communication is used to interface with these modules up to 19.2 kb/s, making it easy to interface to a general purpose computer or to a small microcontroller that may be used in the reified device 100. Infrared can also be used for the wireless connection. In particular, in view of the IrDA standard most laptop computers now have a built-in IR port.

While this invention has been described in conjunction with the exemplary embodiments set forth above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of communicating information about a user of a responsive device to the responsive device, comprising:
    storing information about the user in a physically manipulatable device;
    providing a manipulative user interface between the responsive device and the physically manipulatable device;
    placing an object relative to the physically manipulatable device, where the object indicates a state of the user independent of physical manipulation of the object by the user; and
    communicating, by the physically manipulatable device, a subset of the stored user information to the responsive device, wherein the subset is determined based on the state of the user indicated by the object in conjunction with the relative placement of the object and the physically manipulatable device.

2. The method of claim 1, wherein the communicated stored information comprises the level of authority of the user.

3. The method of claim 1, wherein the object is a hat.

4. The method of claim 1, wherein the subset of the stored information about the user includes, based on the state of the user indicated by the object, the user's level of access to the responsive device.

5. The method of claim 1, wherein relatively placing the object and the physically manipulatable device and/or physically manipulating the physically manipulatable device causes the physically manipulatable device to record macros and/or playback macros within the responsive device.

6. A method of communicating information about a user of a responsive object to the responsive object, comprising:
    storing information about the user in a physically manipulatable reified device;
    providing a manipulative user interface between the responsive device and the physically manipulative reified device
    placing an object relative to the physically manipulatable reified device, where the object indicates a state of the user independent of physical manipulation of the object by the user; and
    communicating, by the physically manipulatable reified device, a subset of the stored user information to the responsive device, wherein the subset is determined based on the state of the user indicated by the object in conjunction with the relative placement of the object and the physically manipulatable reified device.

7. The method of claim 6, wherein the communicated stored information comprises an asset of the user.

8. The method of claim 6, wherein the subset of the stored information about the user includes, based on the state of the user indicated by the object, the user's level of access to the responsive device.

9. The method of claim 6, wherein relatively placing the object and the physically manipulatable device and/or physically manipulating the physically manipulatable device causes the physically manipulatable device to record macros and/or playback macros within the responsive device.

10. A physically manipulatable device for interfacing and communicating with a computer, comprising a physical representation of one user of the computer, the physical representation comprising:
    a manipulatable user interface to communicate with the computer;
    at least one physically manipulatable element to store information about the user; and
    an object placed relative to the physically manipulatable element, where the object indicates a state of the user independent of physical manipulation of the object by the user, wherein the physically manipulatable element communicates a subset of the stored user information to the manipulatable user interface, where the subset is determined based on the state of the user indicated by the object in conjunction with the relative placement of the object and the physically manipulatable element.

11. The device of claim 10, where the communicated stored information includes the level of authority of the user.

12. The device of claim 10, wherein the subset of the stored information about the user includes, based on the state of the user indicated by the object, the user's level of access to the computer.

13. The device of claim 10, wherein the object being so placed and/or that at least one physically manipulatable element being physically manipulated causes the physically manipulatable device to record macros and/or playback macros within the computer.

14. A reified device for interfacing and communicating with a computer, comprising a physical representation of a user of the computer, the physical representation comprising:
 a manipulatable user interface to communicate with the computer;
 an object placed relative to the manipulatable user interface, where the object indicates a state of the user independent of physical manipulation of the object by the user; and
 at least one physically manipulatable element to store information about the user,
 wherein the physically manipulatable element communicates a subset of the stored user information to the manipulatable user interface, where the subset is determined based on the state of the user indicated by the object in conjunction with the relative placement of the object and the physically manipulatable element.

15. The reified device of claim 14, wherein the communicated stored information comprises an asset of the user.

16. The reified device of claim 15, wherein the asset is a credit card number.

17. The reified device of claim 16, wherein the object used to manipulate the reified device is an object that can be placed into at least one predefined relationship to reified device.

18. The device of claim 14, wherein the subset of the stored information about the user includes, based on the state of the user indicated by the object, the user's level of access to the computer.

19. The device of claim 14, wherein the object being so placed and/or that at least one physically manipulatable element being physically manipulated causes the physically manipulatable device to record macros and/or playback macros within the computer.

* * * * *